UNITED STATES PATENT OFFICE.

JOHN MURPHY, OF COLUMBUS, OHIO.

HYDRAULIC CEMENT.

SPECIFICATION forming part of Letters Patent No. 382,376, dated May 8, 1888.

Application filed February 23, 1888. Serial No. 264,964. (No specimens.)

*To all whom it may concern:*

Be it known that I, JOHN MURPHY, a citizen of the United States, residing at Columbus, in the county of Franklin and State of Ohio, have invented a certain new and useful Improvement in Cement; and I do hereby declare the following to be a full, clear, and exact description of my invention, such as will enable others skilled in the art to make and use it.

My invention relates to an improvement in hydraulic or Portland cement, and particularly relates to the improvement of that composition described and claimed in Letters Patent No. 347,367, dated August 17, 1886, issued to myself and Nathaniel W. Lord.

The object of my invention is to produce a cement of great tenacity and durability; and to this end it consists in combining, in the proportions hereinafter stated, limestone, furnace-slag, clay, and water.

In making my cement I take of limestone, about ninety parts; of slag, about seventy parts; of clay, about twenty-two parts. The limestone, slag, and clay having been ground together, the mixture is then moistened with water until a plastic mass is formed, which is roughly made into blocks of the desired shape. These blocks are then dried and burned by the process usually employed in the manufacture of Portland cement, after which they are reduced in the usual manner to a powder.

It will be observed that the salt mentioned in the patent above referred to is omitted from my present list of ingredients.

I have found by experiment that the addition of salt to the above-described mixture is unnecessary, and that its presence tends to prevent the cement from drying as rapidly as desired, and impairs the process of integration.

Having thus fully described my invention, what I claim, and desire to secure by Letters Patent, is—

A Portland or hydraulic cement composed of limestone, furnace-slag, and clay, which ingredients are mixed, burned, and then reduced to powder, substantially as described.

JOHN MURPHY.

In presence of—
THOMAS M. BIGGER,
C. C. SHEPHERD.